United States Patent
Choi

(10) Patent No.: US 10,030,721 B2
(45) Date of Patent: Jul. 24, 2018

(54) METHOD AND APPARATUS FOR CONTROLLING DUAL CLUTCH TRANSMISSION

(71) Applicant: Hyundai Autron Co., Ltd., Seongnam-si (KR)

(72) Inventor: Seung Man Choi, Gunpo-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 300 days.

(21) Appl. No.: 14/947,731

(22) Filed: Nov. 20, 2015

(65) Prior Publication Data

US 2016/0146272 A1 May 26, 2016

(30) Foreign Application Priority Data

Nov. 24, 2014 (KR) .......................... 10-2014-0164492

(51) Int. Cl.
*F16D 48/06* (2006.01)
*G07C 5/02* (2006.01)

(52) U.S. Cl.
CPC .............. *F16D 48/06* (2013.01); *G07C 5/02* (2013.01); *F16D 2500/1083* (2013.01); *F16D 2500/1085* (2013.01); *F16D 2500/10412* (2013.01); *F16D 2500/3022* (2013.01); *F16D 2500/30421* (2013.01); *F16D 2500/50239* (2013.01); *F16D 2500/7041* (2013.01); *F16D 2500/70404* (2013.01)

(58) Field of Classification Search
CPC ...................... F16D 48/06; F16D 48/10; F16D 2500/10412; F16D 2500/3022; F16D 2500/50239; F16D 2500/5102; F16D 2500/5108
See application file for complete search history.

(56) References Cited

U.S. PATENT DOCUMENTS

| | | | | |
|---|---|---|---|---|
| 2005/0107214 | A1* | 5/2005 | Koenig | F16H 61/12 477/174 |
| 2011/0300991 | A1* | 12/2011 | Walker | F16D 48/06 477/79 |
| 2013/0261912 | A1* | 10/2013 | Arai | F16H 61/061 701/60 |

FOREIGN PATENT DOCUMENTS

| | | |
|---|---|---|
| EP | 1 266 788 B1 | 5/2007 |
| JP | 3-79850 A | 4/1991 |
| JP | 6-264778 A | 9/1994 |
| JP | 2007-255466 A | 10/2007 |
| JP | 5460870 B2 | 4/2014 |
| KR | 2012-0038797 A | 4/2012 |
| KR | 2012-0077737 A | 7/2012 |
| KR | 2014-0073306 A | 6/2014 |

(Continued)

*Primary Examiner* — Edwin A Young
(74) *Attorney, Agent, or Firm* — Morgan, Lewis & Bockius LLP

(57) ABSTRACT

A method for controlling a dual clutch transmission (DCT) may include: determining, by a state determination unit, whether a clutch of the DCT is stuck; disabling, by a control unit, the clutch when it is determined that the clutch is stuck; controlling, by the control unit, the driving unit to control the disabled clutch through a reference operation; determining, by the state determination unit, whether the disabled clutch is normally operated, when a vehicle is stopped; and enabling, by the control unit, the clutch when it is determined that the disabled clutch is normally operated.

12 Claims, 3 Drawing Sheets

(56) References Cited

FOREIGN PATENT DOCUMENTS

WO     WO 2012/081191 A1     6/2012

\* cited by examiner

METHOD AND APPARATUS FOR CONTROLLING DUAL CLUTCH TRANSMISSION

CROSS-REFERENCES TO RELATED APPLICATIONS

The present application claims priority to Korean application number 10-2014-0164492, filed on Nov. 24, 2014, which is incorporated by reference in its entirety.

BACKGROUND OF THE INVENTION

The present invention relates to a method and apparatus for controlling a dual clutch transmission (DCT), and more particularly, to a method and apparatus for controlling a DCT, which is capable of fixing a mechanical stuck problem occurring in a clutch of the DCT and helping a vehicle to be normally operated.

DCT refers to a transmission system which has the efficiency of a manual transmission and the convenience of an automatic transmission. The DCT can rapidly shift gears using two clutches (first and second clutches).

The reason why the DCT is getting the spotlight is that the DCT has various advantages.

First, the DCT has the efficiency of a manual transmission.

That is, the DCT has a simpler structure than a conventional automatic transmission which uses a complex planetary gear set. Since power is directly transmitted through the clutches, the DCT has higher efficiency than an automatic transmission which uses fluid transport of a torque converter.

Second, the DCT can continuously transmit power.

That is, since the DCT shifts gears while alternately using two clutches, the power is hardly interrupted even when the DCT shifts gears.

For example, odd gears such as first, third, and fifth gears are connected to the first clutch, and even gears such as second, fourth, and sixth gears are connected to the second clutch.

When a vehicle includes only one clutch, only a third gear is engaged in case where a driver shifts into the third gear. In the DCT, however, second and fourth gears corresponding to the upper and lower gears of the third gear are engaged in a standby state. Thus, when a driver shifts into the second or fourth gear from the third gear, the second or fourth gear is immediately engaged. Therefore, the gear shifting can be smoothly and rapidly performed.

Due to such an advantage, the DCT has been developed and mass-produced by various makers such as Porsche and Volkswagen.

The related art of the present invention is disclosed in Korean Patent Laid-open Publication No. 2012-0077737 published on Oct. 7, 2012 and entitled "Method and apparatus for controlling DCT for vehicle").

The DCT includes a variety of parts connected therein, and a failure may occur in the connections between the respective parts due to various causes.

When a clutch is stuck, normal gear shifting cannot be performed. Thus, when a clutch is stuck, the conventional DCT enters a limp home mode in which the DCT disables the stuck clutch and performs gear shifting only through the other clutch.

However, when the DCT enters the limp home mode in case where a clutch for engaging the reverse gear is stuck, the vehicle cannot be backed. In this case, a driver may be exposed to a dangerous situation. Furthermore, operation to an auto repair shop which is the purpose of the limp home mode is impossible.

BRIEF SUMMARY

Embodiments of the present invention are directed to a method and apparatus for controlling a DCT, which is capable of fixing a mechanical stuck problem occurring in a clutch of the DCT and helping a vehicle to be normally operated.

In one embodiment, a method for controlling a DCT may include: determining, by a state determination unit, whether a clutch of the DCT is stuck; disabling, by a control unit, the clutch when it is determined that the clutch is stuck; controlling, by the control unit, a driving unit to control the disabled clutch through a reference operation; determining, by the state determination unit, whether the disabled clutch is normally operated, when a vehicle is stopped; and enabling, by the control unit, the clutch when it is determined that the disabled clutch is normally operated.

The determining of whether the clutch is stuck may include: changing, by the state determination unit, a target position of the clutch; determining whether a position of the clutch is fixed; and determining whether a current of the driving unit for driving the clutch exceeds a preset reference current, and the state determination unit determines that the clutch is stuck, when the current of the driving unit exceeds the reference current in a state where the position of the clutch is fixed.

The determining of whether the clutch is stuck may further include determining whether the time during which the current of the driving unit exceeds the reference current passes a reference time, and when the time during which the current of the driving unit exceeds the reference current passes the reference time, the state determination unit determines that the clutch is stuck.

The method may further include disengaging an engaged gear corresponding to the disabled clutch, after the disabling of the clutch.

The determining of whether the disabled clutch is normally operated may include: changing, by the state determination unit, a target position of the disabled clutch; and determining whether a RPM of an input shaft of the disabled clutch coincides with an engine RPM, and when the RPM of the input shaft of the disabled clutch coincides with the engine RPM, the state determination unit determines that the disabled clutch is normally operated.

The method may further include determining, by the control unit, whether the disabled clutch is released, after the disabling of the clutch, wherein when the disabled clutch is released, the control unit controls the disabled clutch through the reference operation.

In the controlling of the driving unit to control the disabled clutch through the reference operation, the control unit may control the driving unit to reciprocate the disabled clutch.

In the controlling of the driving unit to control the disabled clutch through the reference operation, the control unit may control the driving unit to repetitively advance and retreat the disabled clutch along a moving direction of the clutch.

In another embodiment, an apparatus for controlling a DCT may include: a state determination unit configured to determine whether a clutch of the DCT is stuck and normally operated; a control unit configured to disable the clutch and control the disabled clutch through a reference operation, when it is determined that the clutch is stuck; and a driving unit configured to control the disabled clutch through the reference operation according to the control of the control unit.

The state determination unit may include: an abnormal state determination unit configured to determine whether the clutch is stuck; and a normal state determination unit configured to determine whether the clutch is normally operated.

The abnormal state determination unit may change a target position of the clutch and determines that the clutch is stuck, when a current of the driving unit exceeds a preset reference current in a state where the position of the clutch is fixed.

The normal state determination unit may change a target position of the disabled clutch when a vehicle is stopped, and determines that the disabled clutch is normally operated, when a RPM of an input shaft of the disabled clutch coincides with an engine RPM.

The control unit may control the driving unit to reciprocate the disabled clutch, when the control unit controls the disabled clutch through the reference operation.

The control unit may control the driving unit to repetitively advance and retreat the disabled clutch along a moving direction of the clutch.

DETAILED DESCRIPTION

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
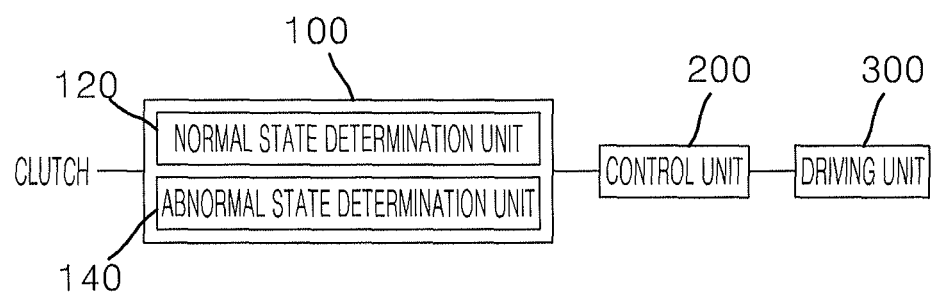
FIG. 1 is a block diagram of an apparatus for controlling a dual clutch transmission (DCT) in accordance with an embodiment of the present invention.

FIG. 1 is a block diagram of an apparatus for controlling a dual clutch transmission (DCT) in accordance with an embodiment of the present invention.

Referring to FIG. 1, the apparatus for controlling a DCT may include a state determination unit 100, a control unit 200, and a driving unit 300.

The state determination unit 100 may determine whether the clutches of the DCT are stuck and normally operated.

At this time, the clutch of the DCT may include a clutch plate, various bearings, an oil seal, a lever, a spring, a shaft, and a cable. Due to various causes, a failure may occur in the clutch.

In particular, when a limp home mode is simply applied in case where the clutch is stuck as a failure of the clutch, the vehicle may not be reversed due to the characteristic of the DCT. In this case, a driver may face a dangerous situation.

In the present embodiment, the state determination unit 100 may determine whether a clutch of the DCT is stuck. When a clutch of the DCT is stuck, the control unit 200 may perform an operation of unsticking the clutch.

Specifically, the state determination unit 100 may include an abnormal state determination unit 140 and a normal state determination unit 120. The abnormal state determination unit 140 may determine whether a clutch is stuck, and the normal state determination unit 120 may determine whether the clutch is normally operated.

The abnormal state determination unit 140 may change a target position of the clutch and determine that the clutches are stuck, when a current of the driving unit 300 exceeds a preset reference current in a state where the position of the clutch is fixed.

That is, when the position of the clutch is fixed even though the driving unit 300 is operated to move the clutch to the target position, the abnormal state determination unit 140 may determine that the corresponding clutch is stuck.

In particular, when the clutch is stuck, the position of the clutch may be fixed even though the driving unit 300 is operated to control the clutch. Thus, the torque or current of the driving unit 300 may be increased to operate the clutch. Therefore, the abnormal state determination unit 140 may determine whether the current of the driving unit 300 exceeds the reference current.

At this time, the reference current may indicate a current of the driving unit 300, at which it can be determined that the clutch is stuck.

In the present embodiment, the abnormal state determination unit 140 may additionally determine whether the time during which the current of the driving unit 300 exceeds the reference current passes a reference time. When the time during which the current of the driving unit 300 exceeds the reference current passes the reference time, the abnormal state determination unit 140 may determine that the clutch is stuck.

When the current of the driving unit 300 is temporarily measured as a value containing an error, the current of the driving unit 300 may exceed the reference current. Thus, when the current of the driving unit 300 exceeds the reference current during at least the reference time, the abnormal state determination unit 140 may determine that the clutch is stuck.

At this time, the reference time may indicate a time required for determining whether the clutch is stuck. The reference time may be set to various values according to the performance of the vehicle.

The process of the normal state determination unit 120 to determine whether the clutch is normally operated will be described below in detail.

When the abnormal state determination unit 140 determines that a clutch is stuck, the control unit 200 may disable the corresponding clutch and control the disabled clutch through a preset reference operation, thereby unsticking the clutch.

That is, the control unit 200 may disable the stuck clutch and enable only the other clutch of the DCT. Then, the vehicle may be operated through a gear shifting operation of the other clutch.

In the present embodiment, the control unit 200 may control the driving unit 300 to reciprocate the stuck clutch, in order to unstick the clutch.

That is, the control unit 200 may control the driving unit 300 to repetitively advance and retreat the stuck clutch along the moving direction of the clutch, thereby unsticking the clutch.

Furthermore, the control unit 200 may disable the stuck clutch and determine whether the disabled clutch is released. When the disabled clutch is released, the control unit 200 may control the corresponding clutch through the reference operation to unstick the clutch.

That is, the present embodiment is characterized in that the control unit 200 unsticks a clutch when an open stuck occurred in the clutch instead of a closed stuck.

Furthermore, the control unit 200 may disable the stuck clutch, and disengage an engaged gear corresponding to the disabled clutch.

That is, when a gear corresponding to a specific stuck clutch is engaged in case where the stuck clutch was disabled as described above, the operation of the gear may cause a problem in the engine operation of the vehicle.

Thus, when determining that the clutch is stuck, the control unit 200 may not only disable the clutch, but also control the clutch through the reference operation in a state where the engagement of the gear corresponding to the clutch is disengaged.

As such, when a specific clutch is stuck, the control unit 200 needs to control the clutch through the reference operation, and determine whether the clutch is unstuck according to the control of the reference operation.

Thus, the normal state determination unit 120 of the state determination unit 100 may determine whether the disabled clutch is normally operated. Specifically, the normal state determination unit 120 may change a target position of the disabled clutch, and determine that the clutch is normally operated, when the RPM of the input shaft of the disabled clutch coincides with the RPM of the engine.

In particular, the normal state determination unit 120 may determine whether the disabled clutch is normally operated in a state where the vehicle is stopped.

That is, while the vehicle is operated, the rotation speed of the clutch tends to be proportional to the speed of the vehicle, due to the resistance caused by various bearings of the transmission. In particular, since the influence of the resistance increases at high speed, the clutch is rotated at the same speed as the engine RPM, even though the clutch is completely released.

Thus, in order to exclude the influence of the vehicle speed and to determine whether the disabled clutch was recovered to a normal state, the normal state determination unit 120 may determine whether the clutch is normally operated in a state where the vehicle is stopped.

As described above, the normal state determination unit 120 may compare the RPM of the input shaft of the clutch to the engine RPM, in order to determine whether the clutch is normally operated. However, the present embodiment is not limited thereto, but the state determination unit 100 may determine whether the clutch was unstuck, through various methods which are publicly known or not publicly known.

When it is determined that the disabled clutch is normally operated, the control unit 200 may enable the disabled clutch again. Then, the DCT may change the speed of the vehicle using the two clutches.

The driving unit 300 may control the disabled clutch through the reference operation according to the control of the control unit 200.

As described above, the driving unit 300 may repetitively advance and retreat the clutch along the moving direction of the disabled clutch according to the control of the control unit 200, in order to unstick the clutch.

Figure 2:
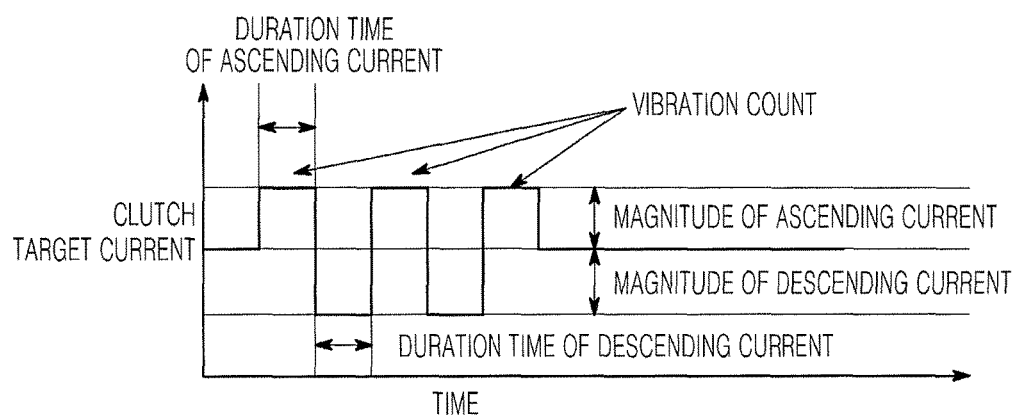
FIG. 2 is a diagram illustrating a reference operation signal for controlling a clutch of the DCT in accordance with the embodiment of the present invention, when the clutch is stuck.

FIG. 2 is a diagram illustrating a reference operation signal for controlling a clutch of the DCT in accordance with the embodiment of the present invention, when the clutch is stuck.

As illustrated in FIG. 2, the control unit 200 may adjust the duty ratio of the driving unit 300 to repetitively advance and retreat the clutch.

At this time, a duration time of an ascending current for moving the clutch in one direction or a duration time of a descending current for moving the clutch in the other direction and the vibration count of the corresponding current may be set to various values depending on how the clutch is stuck.

That is, when the clutch is severely stuck, the control unit 20 may increase the duty ratio of the ascending or descending current or the variation number in order to more efficiently unstick the clutch.

Figure 3:
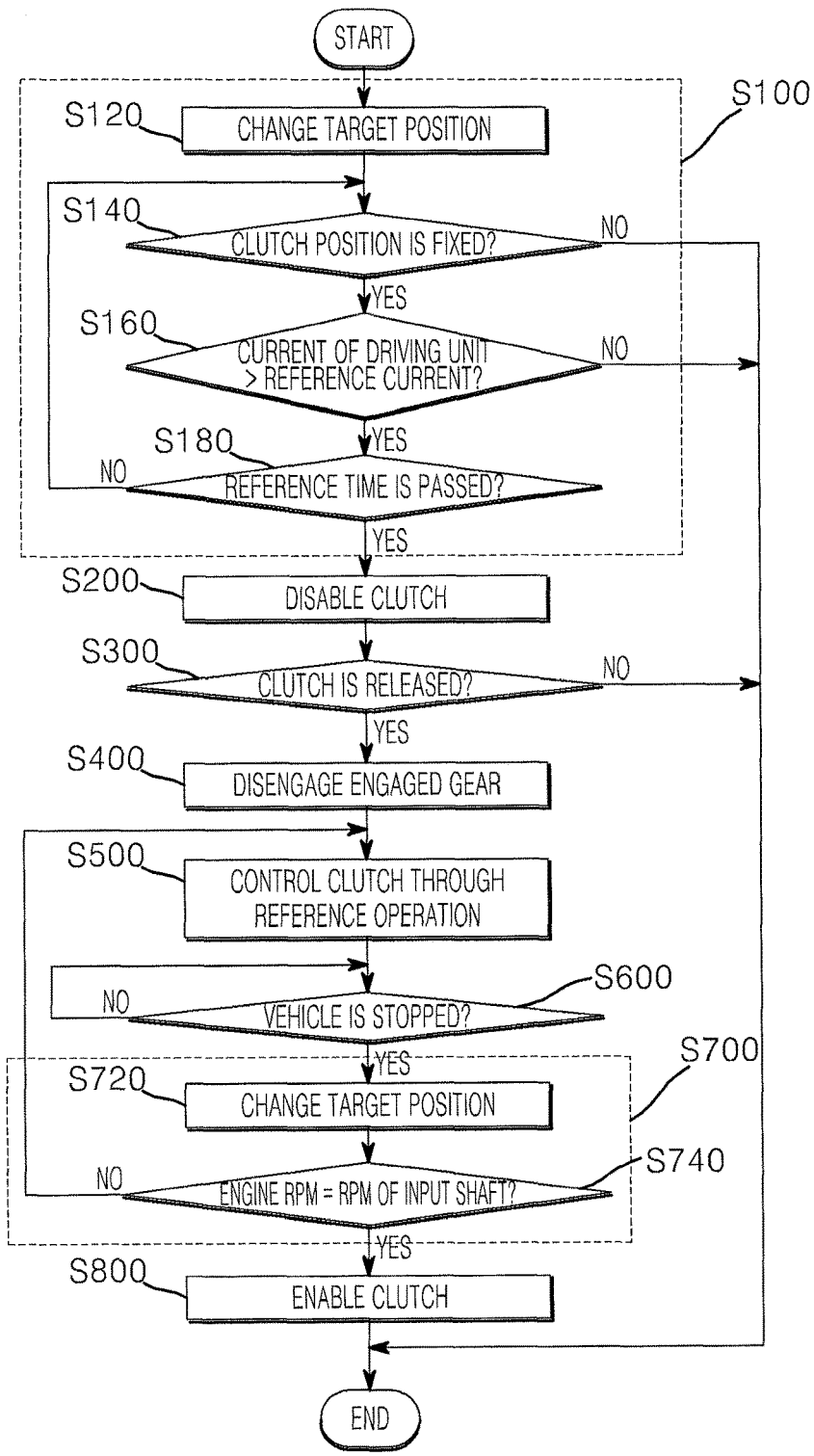
FIG. 3 is a flowchart illustrating a method for controlling a DCT in accordance with an embodiment of the present invention.

FIG. 3 is a flowchart illustrating a method for controlling a DCT in accordance with an embodiment of the present invention.

Referring to FIG. 3, the method for controlling a DCT in accordance with the embodiment of the present invention will be described as follows. First, the abnormal state determination unit 140 may determine whether the clutches of the DCT are stuck, at step S100.

Specifically, the abnormal state determination unit 140 may change the target position of a specific clutch at step S120, determine whether the position of the clutch is fixed even though the clutch was controlled to move to the target position at step S140, and determine whether the current of the driving unit 300 exceeds a preset reference current at step S160. When the current of the driving unit 300 exceeds the reference current in a state where the position of the clutch is fixed, the abnormal state determination unit 140 may determine that the clutch is stuck.

That is, when the position of the clutch is fixed even though the driving unit 300 is operated to move the clutch to the target position, the abnormal state determination unit 140 may determine that the corresponding clutch is stuck.

In particular, when the clutch is stuck, the position of the clutch may be fixed even though the driving unit 300 is operated to control the clutch. Thus, the torque or current of the driving unit 300 may be increased to operate the clutch. Therefore, the abnormal state determination unit 140 may determine whether the current of the driving unit 300 exceeds the reference current.

Furthermore, the abnormal state determination unit 140 may additionally determine whether the time during which the current of the driving unit 300 exceeds the reference current passes a preset reference time, at step S180. When the time during which the current of the driving unit 300 exceeds the reference current passes the reference time, the abnormal state determination unit 140 may determine that the clutch is stuck.

That is, when the current of the driving unit 300 is temporarily measured as a value containing an error, the current of the driving unit 300 may exceed the reference current. Thus, when the current of the driving unit 300 exceeds the reference current during at least the reference time, the abnormal state determination unit 140 may determine that the clutch is stuck.

When it is determined at step S100 that the specific clutch is stuck, the control unit 200 may disable the corresponding clutch at step S200.

Specifically, the control unit 200 may disable the stuck clutch and enable only the other clutch of the DCT. Then, the vehicle may be operated through the gear shifting operation of the other clutch.

Then, the control unit 200 may determine whether the disabled clutch is released, at step S300. When the disabled clutch is released, the control unit 200 may disengage an engaged gear corresponding to the disabled clutch at step S400.

That is, when a gear corresponding to a specific stuck clutch is engaged in case where the stuck clutch was disabled as described above, the operation of the gear may cause a problem in the engine operation of the vehicle.

Thus, when it is determined that the clutch is stuck, the control unit 200 may not only disable the clutch, but also disengage the engagement of the gear corresponding to the clutch.

Furthermore, the control unit 200 may control the driving unit 300 to control the disabled clutch through the reference operation at step S500, in order to unstick the clutch.

Specifically, the control unit 200 may control the driving unit 300 to reciprocate the stuck clutch, in order to unstick the clutch.

That is, the control unit 200 may control the driving unit 300 to repetitively advance and retreat the stuck clutch along the moving direction of the clutch, thereby unsticking the clutch.

Then, when the vehicle is stopped at step S600, the normal state determination unit 120 may determine whether the disabled clutch was recovered to a normal state according to the above-described operation of step S500, at step S700.

Specifically, the normal state determination unit 120 may change the target position of the disabled clutch at step S720. When the RPM of the input shaft of the clutch, which is required for moving the clutch to the target position, coincides with the RPM of the engine at step S740, the normal state determination unit 120 may determine that the corresponding clutch is normally operated.

When it is determined that the stuck clutch is normally operated, the control unit 200 may enable the disabled clutch again at step S800. Then, the DCT may change the speed of the vehicle using the two clutches.

On the other hand, when it is determined at step S700 that the clutch is not normally operated, the control unit 200 may continuously control the clutch through the reference operation in a state where the clutch is disabled, at step S500.

In accordance with the embodiment of the present invention, the apparatus and method for controlling a DCT can fix a mechanical sticking which occurs in a clutch of the DCT, and help the vehicle to be normally operated.

Furthermore, the apparatus and method can reduce the time and cost required for replacing and repairing a transmission. In addition, the apparatus and method can be simply implemented only by adding simple control logic, without changing the hardware of the DCT.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for controlling a dual clutch transmission (DCT), comprising:
   determining, by a state determination unit, whether a clutch of the DCT is stuck;
   disabling, by a control unit, the clutch when it is determined that the clutch is stuck;
   controlling, by the control unit, a driving unit to control the disabled clutch through a reference operation;
   determining, by the state determination unit, whether the disabled clutch is normally operated, when a vehicle is stopped; and
   enabling, by the control unit, the clutch when it is determined that the disabled clutch is normally operated.

2. The method of claim 1, wherein the determining of whether the clutch is stuck comprises:
   changing, by the state determination unit, a target position of the clutch;
   determining whether a position of the clutch is fixed; and
   determining whether a current of the driving unit for driving the clutch exceeds a preset reference current, and
   the state determination unit determines that the clutch is stuck, when the current of the driving unit exceeds the reference current in a state where the position of the clutch is fixed.

3. The method of claim 2, wherein the determining of whether the clutch is stuck further comprises determining whether the time during which the current of the driving unit exceeds the reference current passes a reference time, and
   when the time during which the current of the driving unit exceeds the reference current passes the reference time, the state determination unit determines that the clutch is stuck.

4. The method of claim 1, further comprising disengaging an engaged gear corresponding to the disabled clutch, after the disabling of the clutch.

5. The method of claim 1, wherein the determining of whether the disabled clutch is normally operated comprises:
   changing, by the state determination unit, a target position of the disabled clutch; and
   determining whether a RPM of an input shaft of the disabled clutch coincides with an engine RPM, and
   when the RPM of the input shaft of the disabled clutch coincides with the engine RPM, the state determination unit determines that the disabled clutch is normally operated.

6. The method of claim 1, further comprising determining, by the control unit, whether the disabled clutch is released, after the disabling of the clutch,
   wherein when the disabled clutch is released, the control unit controls the disabled clutch through the reference operation.

7. The method of claim 1, wherein during the controlling of the driving unit to control the disabled clutch through the reference operation,
   the control unit controls the driving unit to reciprocate the disabled clutch.

8. The method of claim 7, wherein during the controlling of the driving unit to control the disabled clutch through the reference operation,
   the control unit controls the driving unit to repetitively advance and retreat the disabled clutch along a moving direction of the clutch.

9. An apparatus for controlling a dual clutch transmission (DCT), comprising:
   a state determination unit configured to determine whether a clutch of the DCT is stuck or normally operated;
   a control unit configured to disable the clutch and control the disabled clutch through a reference operation, when it is determined that the clutch is stuck; and a driving unit configured to control the disabled clutch through the reference operation according to the control of the control unit, wherein the control unit controls the driving unit to repetitively advance and retreat the disabled clutch along a moving direction of the clutch, when the control unit controls the disabled clutch through the reference operation.

10. The apparatus of claim 9, wherein the state determination unit comprises:
   an abnormal state determination unit configured to determine whether the clutch is stuck; and
   a normal state determination unit configured to determine whether the clutch is normally operated.

11. The apparatus of claim 10, wherein the abnormal state determination unit changes a target position of the clutch and determines that the clutch is stuck, when a current of the driving unit exceeds a preset reference current in a state where the position of the clutch is fixed.

12. The apparatus of claim 10, wherein the normal state determination unit changes a target position of the disabled clutch when a vehicle is stopped, and determines that the disabled clutch is normally operated, when a RPM of an input shaft of the disabled clutch coincides with an engine RPM.

* * * * *